US006922801B2

(12) United States Patent
Archibald, Jr. et al.

(10) Patent No.: US 6,922,801 B2
(45) Date of Patent: Jul. 26, 2005

(54) STORAGE MEDIA SCANNER APPARATUS AND METHOD PROVIDING MEDIA PREDICTIVE FAILURE ANALYSIS AND PROACTIVE MEDIA SURFACE DEFECT MANAGEMENT

(75) Inventors: John Edward Archibald, Jr., Boulder, CO (US); Brian Dennis McKean, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 09/872,386

(22) Filed: Jun. 1, 2001

(65) Prior Publication Data

US 2002/0184580 A1 Dec. 5, 2002

(51) Int. Cl.[7] .............................................. G11C 29/00
(52) U.S. Cl. ...................................... 714/723; 714/710
(58) Field of Search ................................ 714/719, 723, 714/710, 711

(56) References Cited

U.S. PATENT DOCUMENTS

| | | | | |
|---|---|---|---|---|
| 4,821,251 A | 4/1989 | Hosoya | | 369/44 |
| 5,191,491 A | 3/1993 | Zweighaft | | 360/77.13 |
| 5,535,068 A | 7/1996 | Hughes | | 360/73.04 |
| 5,553,086 A | 9/1996 | Sompel et al. | | 371/47.1 |
| 5,600,816 A | 2/1997 | Oldfield et al. | | 395/440 |
| 5,802,584 A | 9/1998 | Kool et al. | | 711/154 |
| 5,822,142 A | 10/1998 | Hicken | | 360/53 |
| 5,859,823 A | * 1/1999 | Yamamuro | | 369/47.14 |
| 6,025,971 A | 2/2000 | Inoue et al. | | 360/77.08 |
| 6,189,118 B1 | * 2/2001 | Sasaki et al. | | 714/710 |
| 6,438,719 B1 | * 8/2002 | Lindberg et al. | | 714/720 |
| 6,565,608 B1 | * 5/2003 | Fein et al. | | 715/501.1 |

* cited by examiner

Primary Examiner—Joseph D. Torres
(74) Attorney, Agent, or Firm—R. Michael Ananian; Arthur J. Samodovitz

(57) ABSTRACT

A method, computer readable medium, apparatus and RAID controller for performing nondestructive write testing is disclosed. For data storage devices divided into sectors, the present invention performs nondestructive write testing by writing data to the sectors, reading data written to the sectors, and comparing the data written to the data read to detect errors. To increase efficiency, sectors previously written by a host or other computer are tracked, allowing sectors not previously written to be tested without saving and restoring data in the sectors. To locate the sectors written to by the host computer, write indicators such as a sector written indicator, a sector stripe written indicator, and a stripe written indicator are maintained. Upon detecting a defective sector, a new sector is allocated, and the defective sector is replaced by the allocated sector.

20 Claims, 4 Drawing Sheets

STORAGE MEDIA SCANNER APPARATUS AND METHOD PROVIDING MEDIA PREDICTIVE FAILURE ANALYSIS AND PROACTIVE MEDIA SURFACE DEFECT MANAGEMENT

FIELD OF THE INVENTION

This invention pertains generally to data or information storage system and subsystems, and more particularly to controllers and controller methods and procedures for such data or information storage systems and subsystems.

BACKGROUND

As the capacity of data and information storage and retrieval systems and servers increase and the desirability of providing sometimes significant capacity for growth on such systems increases, storage devices, such as rotating magnetic hard disk drives may have large regions of media that are subject to wear and aging by virtue of the operation of the hard disk drive generally, the movement of one or more transducer heads over the media surface when accessing other regions of the disk drive, and any power-up (spin-up) or power-down (spin-down) that the media surface may be subjected to.

Therefore, although it is known to scan disk drive media to determine the viability of writing to and reading from a disk drive surface, such disk drive scanning and testing have heretofore been limited. For example, there remains a need to be able to perform preemptive and proactive diagnostics on regions of a disk drive or other recording media based storage system on a non-interfering basis during normal operation of the storage system so that media that defects are identified before attempts are made to write data to such media. There also remains a need for the ability to perform non-destructive write testing to regions of the disk drives that have previously been written to by a host computer system storing data to and retrieving data from the storage system, particularly where the data may constitute an archive of data or information that was written previously and will not be routinely accessed.

SUMMARY

The present invention provides structure, method, apparatus, system, and computer program for background operation storage media surface scanning and predictive media failure analysis with optional but desirable proactive media defect management. In one embodiment, predictive media failure analysis data and optional reports generated identify incidents of recoverable and unrecoverable storage media read operation and media write operation failures. This media failure analysis data enables proactive media defect management to take any desired or required steps to recover media defects or errors before an attempt is made to read or write (access) an affected portion of the media. For example, the proactive defect management system and method monitors and manages the storage system, storage subsystem, hard disk drives, disk surface, disk sector, or other defined portion of a storage system or device, and takes the necessary steps to recover media errors prior to a host computer attempting to access an affected media, such as a disk sector having a media defect.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF EMBODIMENTS OF THE INVENTION

Figure 1:
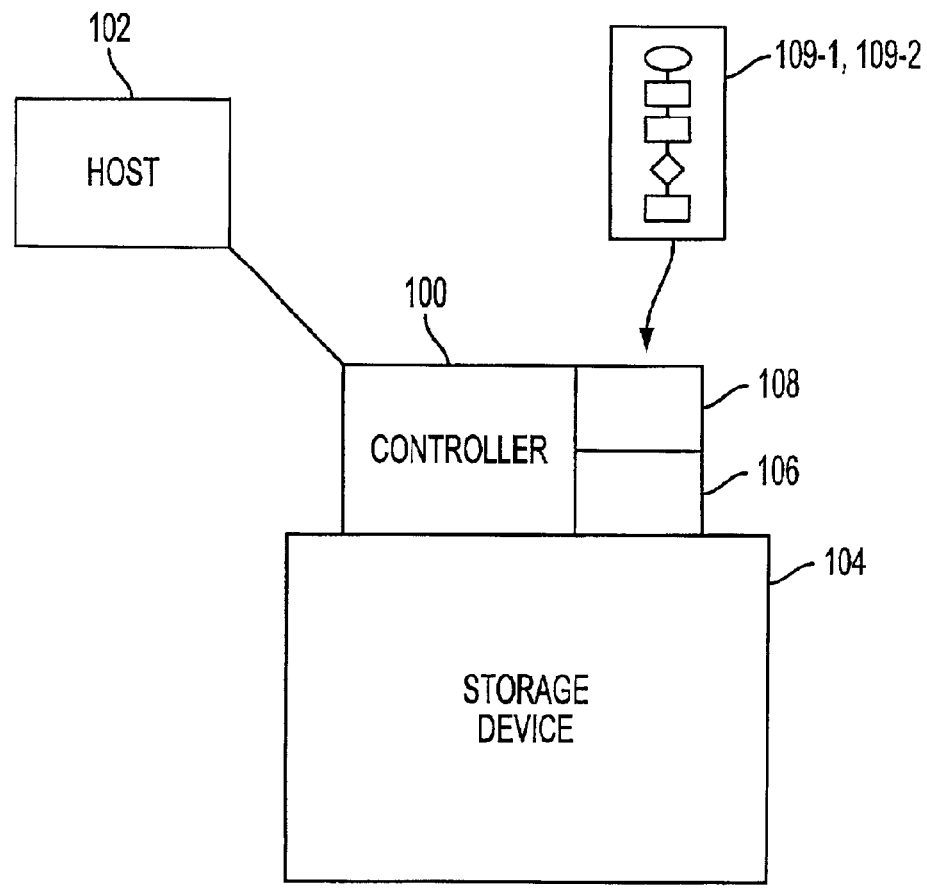
FIG. 1 shows a diagrammatic illustration of components included in various embodiments of the invention.

Among the features and advantages provided by the invention include a background media surface scanner that performs predictive failure analysis and proactive defect management. The predictive failure analysis desirably reports incidents of recoverable and/or unrecoverable read and write failures. These read and write failures being indicative of media surface defects in rotatable mass storage devices, such as magnetic disk drives, optical disk drives, magneto-optical disk drives, linear and helical tape drives, and other devices where there is the possibility of media manufacturing defect, media aging, or damage during operation (such as for example, a transducer head crash onto the surface of a hard disk drive).

The inventive system and method also provide proactive defect detection and management that takes necessary steps to recover media errors prior to the host attempting to access an media region, such as an affected hard disk drive sector. This helps to assure that for systems having large initial storage capacity relative to amount of data initially stored, the remaining unused storage capacity will function properly when needed for additional storage demands.

The inventive system and method further allows a storage media controller, such as an array controller or any other internal or external controller (including for example a controller function implemented by the host CPU), to perform non-destructive write testing on regions of the storage media, such as hard disk drive sectors, that have previously been written by the host. The non-destructive write testing is performed by the array controller reading the host data off the disk and saving it, exercising some stress patterns of writing against the disk drive, and then replacing the host data back onto the disk when the testing is complete. This permits the monitoring and testing of the integrity of the storage media without the need to wait for an actual data access request. It also will typically reduce the time required to complete an I/O operation because an I/O operation to a region having higher integrity will likely complete successfully with fewer retries. In conventional systems, where degradation may be progressive with time, waiting for an actual host data I/O request for a particular item of data in a sector suffering from progressive media surface degradation may result in the inability to recover the stored data. By testing for surface integrity frequently and before the read errors become unrecoverable, it is more likely that the data can be recovered. Even for redundant array of independent disks (RAID) systems where some redundancy is provided, maintaining the integrity and viability of each redundant portion increases the probability that should one portion of the redundant storage fail, its redundant portion will provide viable data for recovery and rebuilding of the array.

In addition, in one embodiment of the inventive system and method, three indicators are used for various regions of the storage device. For rotatable storage media such as hard disk drives, floppy disk drives, optical disk drives, magneto-optical disk drives and the like where data on each device is organized or accessed by sectors, and for which data is written as stripes (such as RAID stripes) the inventive system method, and computer program utilizes a sector written indicator, a sector stripe written indicator, and stripe written indicator. These three fields are desirably maintained as indicator fields in metadata for sectors on one or more storage disks. The inventive structure and method may also or alternatively be applied to other types of memory or storage media that may be susceptible to progressive or post-manufacture degradation.

The inventive system and method also advantageously provides a media surface scanner that keeps track of errors encountered and reallocations performed, and optionally but desirably if pre-set or otherwise specified error and/or real-location thresholds are exceeded, the storage controller notifies a storage system administrator or takes other pre-determined or programmed action.

This inventive system and method significantly reduces the occurrence of completion of host I/O requests being delayed due to media error detection and defect management methods. In prior systems, when a read request is issued to a disk drive or disk drive system (the most frequent type of mass storage devices), if the data can't be read on the first pass, the read operation is retried until successful or a time-out condition occurs, and it may take up to one-hundred or more passes retrying different parameters in the storage device controller's servo or read write channel in attempting to recover the data. If the requested data is unrecoverable after an acceptable time period and the storage device controller accesses another disk on which the data is stored, additional delays are incurred. The present invention solves these and other problems by providing a background task that examines all (or a selected set) of the sectors, such that the delay occurs in the background task. Data in the sectors for with I/O operations are delayed (presumably due to marginal or defective media) is then moved to a sector that doesn't require any (or an unreasonable number of) retries so that when a host system tries to access its data that was previously stored in the delayed sector, the host system is not subject to delays. Thus, the storage device controller is continually testing media storage areas (or other memory) in the background to detect and handle storage failure so that reading and writing to marginal or defective storage areas is avoided. By avoiding such areas, significant data retrieval delays, sometimes on the order of seconds, can be eliminated. In addition, where data may have been stored some time in the past, the inventive structure and method, may beneficially permit testing and relocation of the data before the data becomes unreadable as a result of further damage or deterioration.

In a typical embodiment of the invention, the inventive method is implemented as a computer program or code, such as software or firmware or a combination thereof, executing on a processor of the controller (such as an internal or external controller, or an array controller when the storage system involves a RAID storage system) and its associated memory as a background task during idle time. It is noted that the inventive method and computer program may be executed in any processor, such as the CPU of a stand-alone personal computer, so that the invention is not limited to separate controller devices or to particular storage systems. Alternatively, it may be run or executed manually by a system administrator or operation or invoked programmatically as a foreground process.

An exemplary embodiment of a controller is illustrated in FIG. 1. The controller 100 includes interfaces to host computer 102 and to at least one storage device 104. Typically the system will include a plurality of storage devices organized into a storage system, such as a storage system having one or more RAID storage arrays. When the storage devices are organized as RAIDs, the controller 100 is typically referred to as a RAID controller. The interfaces to the host and to the storage devices may be any of the types known in the art or developed in the future, such as SCSI, IDE, EIDE, USB, Fibre Channel, and so forth.

The controller 100 includes a processor 106 and associated memory 108 (RAM and non-volatile NVRAM). Desirably, the inventive computer program (media surface scanner 109-1 or 109-2) is stored in NVRAM, or other non-volatile memory) so that the program is retained in the event of loss of power to the controller 100. Copies of the inventive computer program may also or alternatively be stored within the storage device so that it may be read into a controller and executed. As used herein, metadata refers to data that describes or is used to manage the user data contained on the disk drives or other storage devices.

Metadata includes data that identifies a region of the storage device or system to which the indicator pertains, a group within the region, and a group written indicator are associated with each storage region. These correspond to a sector written indicator 110, a sector stripe written indicator 112, and a stripe written indicator 114, such as when the storage system or device includes a data and/or parity stripe based RAID disk drive array. Metadata can be stored in several places. In the case of an array of disk drives, the controller 100 reserves space on the storage device 104 for its own purposes. The metadata can be stored in these reserved areas on the disks. If the disks support extended sector formatting, metadata can be stored in each sector. Alternatively, metadata can be stored in nonvolatile memory 108 of the controller 100.

Figure 3:
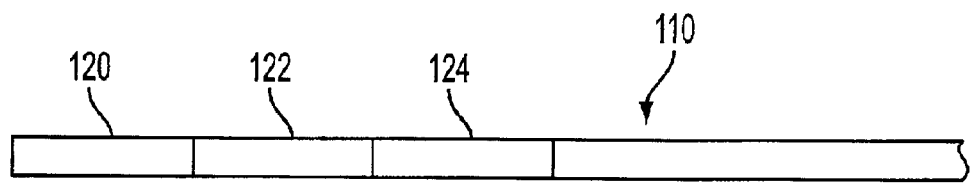
FIG. 3 shows a diagrammatic illustration of the sector written indicator, sector stripe written indicator, and stripe written indicator, as utilized in an exemplary embodiment of the present invention.
Figure 2:
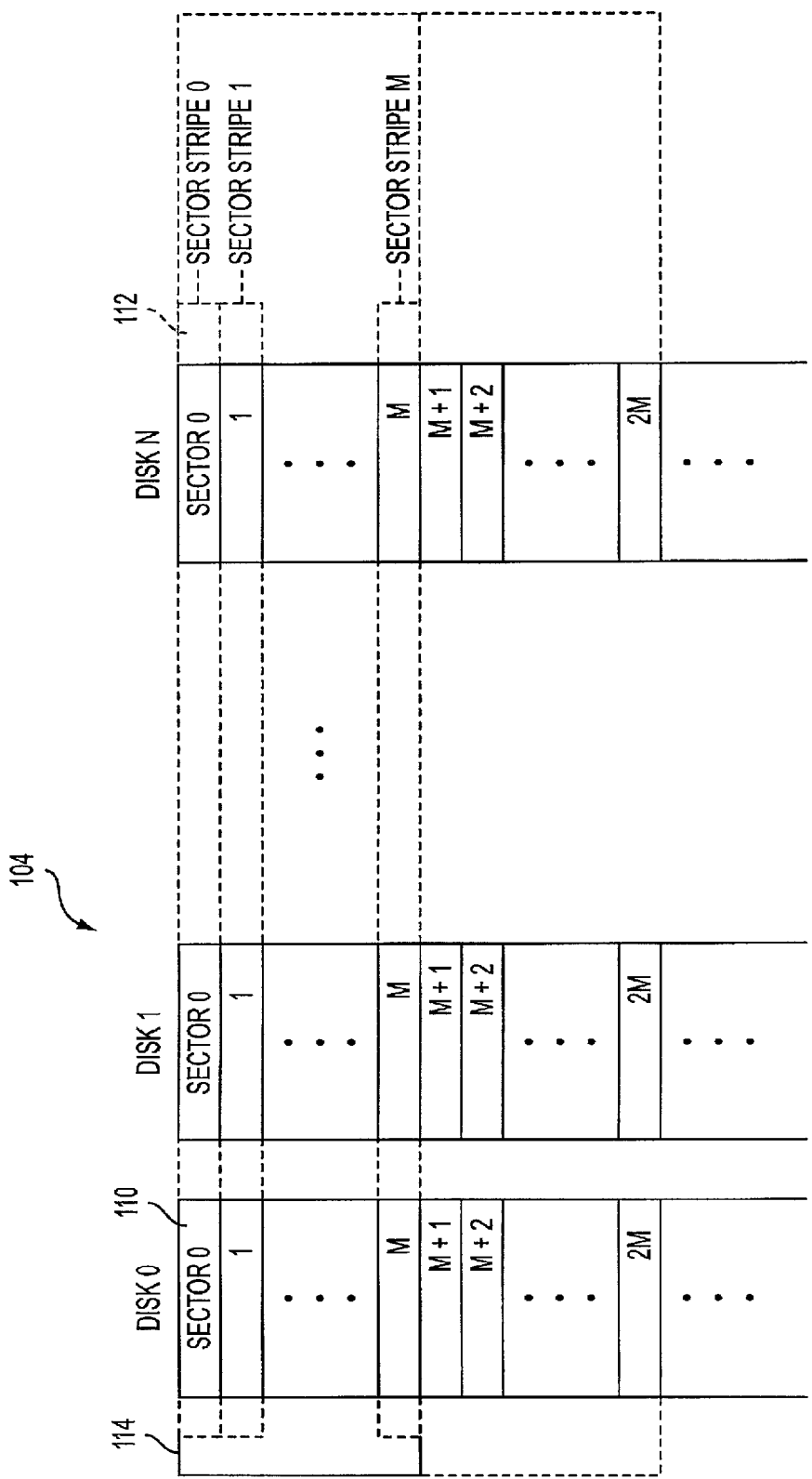
FIG. 2 shows a diagrammatic illustration of a sector, sector stripe, and stripe as utilized in an exemplary embodiment of the present invention.

Directing attention to FIGS. 2 and 3, sector 110 is a portion of a disk to which data can be stored. The sector written indicator 120 has the value "0" when the sector 110 has been formatted but not written to by a host write operation and has the value "1" when the sector 110 has been written to by a host write operation. These indicators may be established by a single bit or logic state or by a plurality of bits. (Other logic conventions may alternatively be applied.) Sector stripe 112 is a collection of sectors similarly located on a plurality of disks. The sector stripe written indicator 122 has the value "0" when the sector stripe 112 has been formatted but not written to by a host write operation and has the logic state or value "1" when the sector stripe 112 has been written to by a host write operation. Stripe 114 is a collection of multiple sector stripes. The stripe written indicator 124 has the value "0" when the stripe 114 has been formatted but not written to by a host write operation and has the value "1" when the stripe 114 has been written to by a host write operation. The indicator fields 120, 122, and 124 is cleared (e.g., the logic state or value of "0") when a system drive is initially formatted for a host computer use. The controller 100 sets (e.g., changes the value to "1") the indicator fields 120, 122, 124 when the host 102 initially writes to the related sector(s). Clearing the fields when the drive is initially formatted assures a known indicator state is written to what would otherwise be an unknown random (e.g. "0" or "1") state. Setting the indicator fields when data is initially written (that is written in a host write operation for the first time after formatting) identifies the media portion, in this embodiment a disk media sector, as having actual data written to it. Identifying portions of the media that contain or store actual data is desirable because the data has to be maintained and occasionally changed. Also, if the data that is requested is stored on a sector that is currently being tested with stress patterns, the data has to be retrieved from another location. It is also advantageous to maintain information about which sectors contain actual data because that data should be available during testing for use by the host and for use to restore the sector after testing.

The sector written indicator 120, sector stripe written indicator 122, and stripe written indicator 124 fields may be maintained as bytes as in embodiments utilizing extended sector formatting. Alternatively, the sector written indicator 110, sector stripe written indicator 112, and stripe written indicator 114 fields may be implemented as a separate data structure, for example, as a data structure defined within a non-user data area of the storage device 104.

As described earlier, sector scanning is preferably performed as a background processing operation by the controller 100 so as not to negatively impact normal I/O operations to the storage device 104. In one embodiment, background scanning and defect analysis is initiated when the storage controller (or processor that is to perform the analysis) workload falls below a preset threshold. This threshold may be fixed, programmable, dynamically adjustable, or set according to any other rules or algorithm. Typically, the threshold is set at between about 60% of capacity and about 80% of capacity for systems that are known to have a high utilization rate, more usually between about 40% of capacity and about 60% of capacity for systems having more moderate utilization rates, and in one particular embodiment at about 50% of capacity. Desirably, the media surface scanner 109-1 or 109-2 will traverse all sectors on the media so that any media defect wherever located can be identified; however, it will be appreciated that the media surface scanner 109-1 or 109-2 may be controlled so as to scan only selected portions of the media, to skip particular portions of the media, to scan selected portions of the media more or less frequently than other portions, or directed to scan according to other predetermined or programmatically constrained rules.

Two different embodiments of media surface scanner 109-1 or 109-2 are now described. In a first embodiment 109-1, sectors not previously written to by the host computer 102 are scanned. Sectors that do not store RAID array control metadata may also or alternatively be scanned according to this method.

Figure 4:
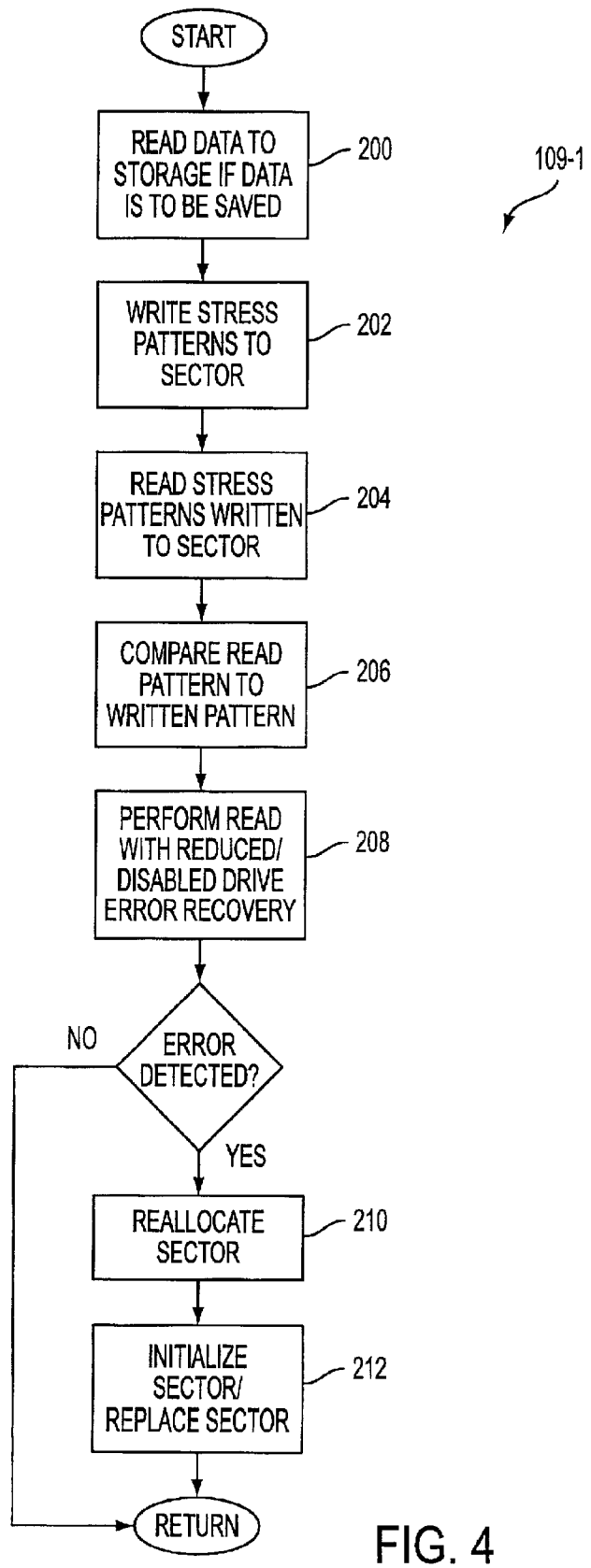
FIG. 4 shows a diagrammatic illustration of the logical sequence of steps or procedures executed in an embodiment of the present invention.

FIG. 4 illustrates the sequence of steps or procedures executed to practice the first embodiment of the method. The embodiment is described in terms of procedures, sub-procedures, and/or steps. At step 200, the controller 100 reads data contained in a sector to a temporary storage location if data in that sector is to be saved or maintained. At step 202, the controller 100 writes data patterns, such stress patterns, to sectors (data and parity) contained in a stripe. Various stress patterns are known in the art of media testing, particularly for rotating magnetic media, and are not described in detail here. The controller 100 then reads back each sector (step 204), and compares the pattern written to the pattern read (step 206). The read may optionally be performed with any available drive error recovery capability reduced or disabled (step 208). Reducing or disabling error detector and recovery would desirably permit a storage device or portion thereof to be replaced before the number or nature of errors increased beyond the number or nature that could be recovered using known error detection and correction techniques. If no errors are detected, no further action is required for that stripe. However, if either a recoverable media error or an unrecoverable media error was reported by a drive on a sector, a defect management procedure is invoked (step 210) that reallocates the sector. The controller 100 then initializes the reallocated sector for host use (step 212) and the reallocated sector replaces the original sector before any further degradation occurs. In one preferred embodiment, error recovery capability is turned off or disabled during the inventive media scan procedure so that errors that might be recoverable during normal operation are detected. Detection of such normally correctable errors may be an early indication of some media surface damage or breakdown. By detecting such errors and reallocating the sector at this early stage while the number and pattern of errors are such that they can be corrected or recovered using the normal error detection and correction procedures, the storage system may be maintained to provide error free operation over extended periods of time.

Figure 5:
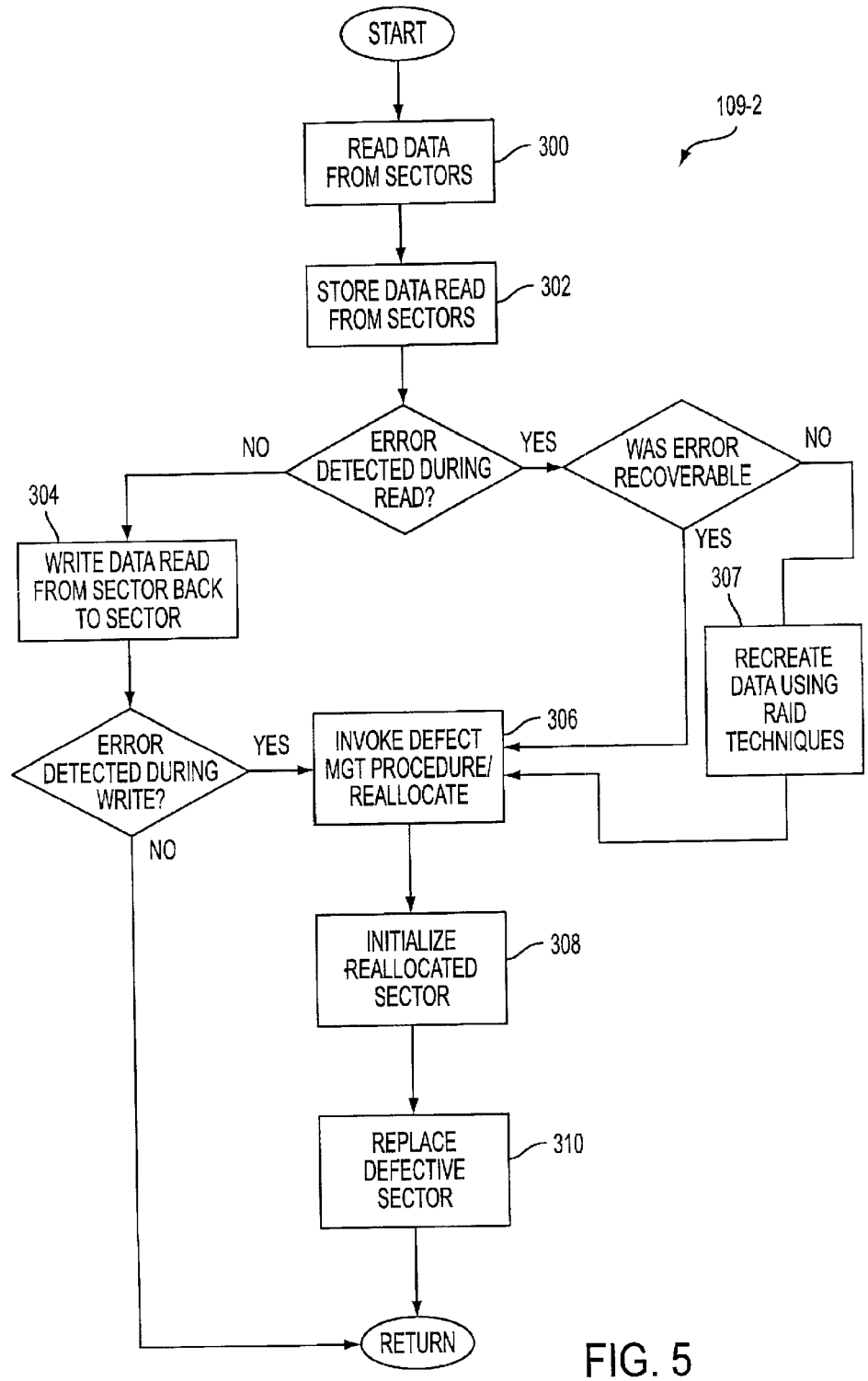
FIG. 5 shows a diagrammatic illustration of the logical sequence of steps or procedures executed in an alternative exemplary embodiment of the present invention.

FIG. 5 illustrates the sequence of steps or procedures executed to practice a second embodiment of the method wherein in the media surface scanner 109-2, the scanning is performed for sectors that have previously been written to by the host, and alternatively or additionally to sectors that do store array control metadata. In this embodiment, the controller 104 reads each of the sectors (step 300) and temporarily stores the data read (step 302). The read operation may optionally be performed with drive error recovery capability reduced or disabled. If no errors are detected during the read phase of the test (step 306), the controller 100 will write back the read data to the sector (step 304). This is a non-destructive write test. If no errors are detected no further action is required. However, if a recoverable media error or unrecoverable media error was reported on a sector, a defect management procedure is invoked (step 306) that reallocates the sector. If the error was unrecoverable, then the controller recreates the data from redundant information using RAID techniques known in the art (step 307). The controller then initializes the reallocated sector for host use (step 308) by writing the saved or recreated host data and replaces the defective sector with the reallocated sector (step 310).

It is noted that when the data is not recoverable during a read operation, the controller can recreate the data using known data recovery or reconstruction techniques and procedures appropriate to RAID redundant storage systems. In situations where data is not redundantly stored, such as systems using a single storage device or disk drive that do not provide redundant storage, then such recovery may not be possible where data can not be read during the read operation.

In either embodiment, the media surface scanner 109-1 and 109-2 track errors encountered and reallocations performed and if pre-set (or otherwise determined) thresholds are exceeded the storage controller 100 may optionally notify a storage system's administrator so that the media itself can be replaced. For example, a RAID disk drive having a number of errors that exceeds such pre-set error thresholds may be swapped out and replaced by a replacement drive. Techniques for rebuilding such RAID storage systems are known in the art an not described in detail here. In another embodiment the controller 100 may automatically replace a RAID disk drive having a number of errors that exceeds a preset error threshold with a spare disk drive. A spare disk drive is a disk drive in a RAID storage system that is available to replace failed disk drives.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. All patents and publications referenced herein are hereby incorporated by reference.

We claim:

1. A method for testing a data storage medium for defects, the method comprising the steps of:
   determining whether a region on said storage medium contains user data, and if so, copying said user data from said region to a temporary storage location;
   after the copying step, attempting to write a data pattern to said region of the storage medium, and then adding back contents of said region;
   comparing said data pattern to said contents of said region which was read back to identify differences;
   if no difference was identified, then writing said user data back to said region,
   if a difference was identified, then replacing said region with a new region for storage of data.

2. The method of claim 1, wherein the step of determining whether a region on said storage medium contains user data comprises the step of examining a sector written indicator.

3. The method of claim 1, wherein the step of determining whether a region on said storage medium contains user data comprises the step of examining a sector stripe written indicator.

4. The method of claim 1, wherein the step of determining whether a region on said storage medium contains user data comprises the step of examining a stripe written indicator.

5. A method of testing a data storage medium for errors in a region of storage device, the method comprising:
   performing nondestructive testing of the region by reading data from a first region of a storage device and writing the data to a temporary location if the data is to be saved;
   writing the data read from the first region back to the first region; and
   if an error is detected either during the reading or during the writing, reallocating a second region, initializing the second region and replacing the first region with the second region; and
   wherein the method is performed on the first region if the first region is identified as a written region by a sector written indicator.

6. The method of claim 5, wherein the method is performed on the first region if the first region is identified as a written region by a sector stripe written indicator.

7. The method of claim 5, wherein the method is performed on the first region if the first region is identified as a written region by a stripe written indicator.

8. A method for testing a data storage medium for defects, the method comprising:
   determining when a usage level of the storage medium is within a range of usage level for which background processing is permitted, and when the usage level is within the permitted range performing as a background process: (i) writing a data pattern to at least one predetermined region of the storage medium; and (ii) reading back the written data pattern;
   comparing the data pattern written to the data pattern read back and identifying and reporting any error;
   if an error was reported, then:
   identifying a defective region;
   reallocating a new region;
   initializing the reallocated region for access; and
   replacing the defective region with the reallocated region.

9. The method of claim 8, further comprising reporting the defective region.

10. The method of claim 8, wherein the determining whether the predetermined region contains data is performed by examining a sector written indicator.

11. The method of claim 8, wherein the determining whether the predetermined region contains data is performed by examining a sector stripe written indicator.

12. The method of claim 8, wherein the determining whether the predetermined region contains da is performed by examining a stripe written indicator.

13. A method of testing a data storage medium for errors in a region of a storage device, the region associated with an indicator that indicates whether a host computer has written data to the region, the method comprising:
   determining that the host computer has written data to the region by examining the indicator;
   as a background process, performing nondestructive testing of the region by reading data from a first region of a storage device and writing the data to a temporary location if the data is to be saved;
   as a background process, writing the data read from the first region back to the first region;
   if an error is detected either during the reading or during the writing, reallocating a second region, initializing he second region and replacing the first region with the second region.

14. The method of claim 13, wherein the method is performed on the first region if the first region is a sector on a disk that is identified as a written region by a sector written indicator.

15. The method of claim 13, wherein the method is performed on the first region if the first region is a plurality of sectors contained on multiple disks and is identified as a written region by a sector stripe written indicator.

16. The method of claim 13, wherein the method is performed on the first region if the first region is a plurality of sectors on a single disk that is identified as a written region by a stripe written indicator.

17. The method of claim 13, further comprising reporting the defective region.

18. A computer program product for use in conjunction with a computer system, the computer program product comprising a computer readable storage medium and a computer program stored therein, the computer program comprising:
   a program module that directs the computer system or a controlled coupled thereto to test a storage medium for defects, the program module including instructions for:
   determining when a usage level of the storage medium is sufficiently low to allow effective background processing;
   as a background process, writing a data pattern to at least one predetermined region of the storage medium;
   as a background process, reading back the written data pattern;

comparing the data pattern written to the data pattern read back and identifying and reporting any error;

if an error was reported, performing the steps of:
  identifying a defective region;
  reallocating a new region;
  initializing the reallocated region for access; and
  replacing the defective region with the reallocated region.

19. A computer program product for use in conjunction with a computer system, the computer program product comprising a computer readable storage medium and a computer program stored therein, the computer program comprising: a program module that directs the computer system or a controller coupled thereto to test a data storage medium for errors in a region of a storage device, the region associated with an indicator that indicates whether a host computer has written data to the region, the program module including instructions for:

determining that the host computer has written data to the region by examining the indicator;
  as a background process, performing nondestructive testing of the region by reading data from a first region of a storage device and writing the data to a temporary location if the data is to be saved;
  as a background process, writing the data read from the first region back to the first region;

if an error is detected either during the step of reading or during the step of writing, reallocating a second region, initializing the second region and replacing the first region with the second region.

20. A method for testing a data storage medium for defects, the method comprising:
  as a background procedure by a processor acting as a controller when processor utilization is below a predetermined threshold: (a) writing a data pattern to at least one predetermined region of the storage medium; (b) reading back the written data pattern; (c) comparing the data pattern written to the data pattern read back and identifying any error in the data; and (d) if an error in the data was identified, then: (i) identifying a defective region of the storage medium; (ii) reallocating a new region of the storage medium; (iii) initializing the reallocated new region for access; and (iv) replacing the defective region with the reallocated region; and
  determining whether the predetermined region contains user data by examining at least one of a sector written indicator or a sector stripe written indicator, and retrieving the user data and storing it to a temporary location before testing the predetermined region, and writing the saved user data back to the predetermined region if no error is detected.

* * * * *